E. O. COATS.
ROLLER BEARING WORM DRIVE.
APPLICATION FILED APR. 24, 1917.

1,256,440.

Patented Feb. 12, 1918.
2 SHEETS—SHEET 1.

Witnesses
C. R. Beall.
J. T. Riley.

Inventor
E. O. Coats.
By
Attorney

E. O. COATS.
ROLLER BEARING WORM DRIVE.
APPLICATION FILED APR. 24, 1917.
1,256,440.
Patented Feb. 12, 1918.
2 SHEETS—SHEET 2.
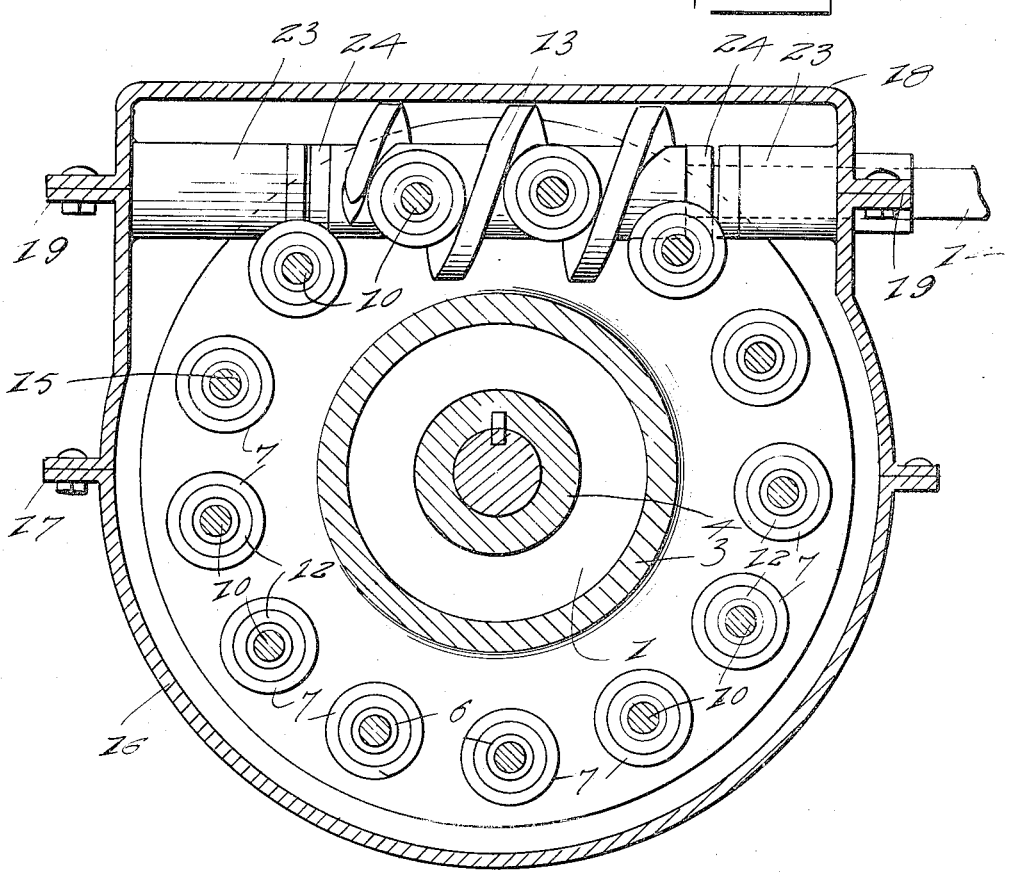
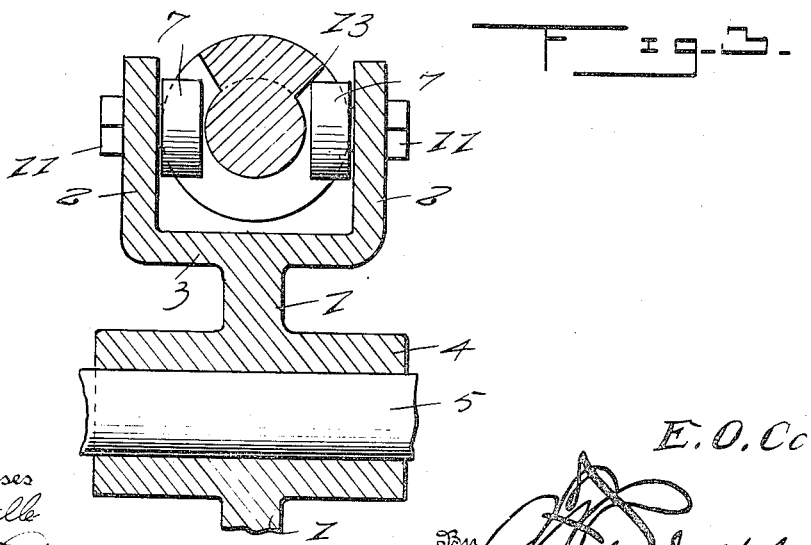
Witnesses
C. P. Beall
H. T. Riley
Inventor
E. O. Coats.
Attorney

UNITED STATES PATENT OFFICE.

EDWARD O. COATS, OF POSTOAK, MISSOURI, ASSIGNOR OF ONE-HALF TO W. L. DOWNING AND H. K. DOWNING, BOTH OF CHILHOWEE, MISSOURI.

ROLLER-BEARING WORM DRIVE.

1,256,440.  Specification of Letters Patent.  Patented Feb. 12, 1918.

Application filed April 24, 1917. Serial No. 164,180.

*To all whom it may concern:*

Be it known that I, EDWARD O. COATS, a citizen of the United States, residing at Postoak, in the county of Johnson and State of Missouri, have invented certain new and useful Improvements in Roller - Bearing Worm Drives; and I do hereby declare the following to be a full, clear, and exact description of the invention, such as will enable others skilled in the art to which it appertains to make and use the same.

The invention relates to improvements in worm drives.

The object of the present invention is to provide a simple, practical and efficient roller-bearing worm drive of strong, durable and inexpensive construction adapted to reduce the friction incident to gearing of this character to a minimum, and capable of placing the strain on a plurality of rollers, so that in the operation of the gearing no one roller will be subjected to the entire strain incident to driving the worm wheel.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Fig. 2 is a vertical sectional view of the roller-bearing worm drive taken longitudinally of the worm shaft.

Fig. 3 is a transverse sectional view of the same.

Like numerals of reference designate corresponding parts in all the figures of the drawings.

Figures 1, 4:
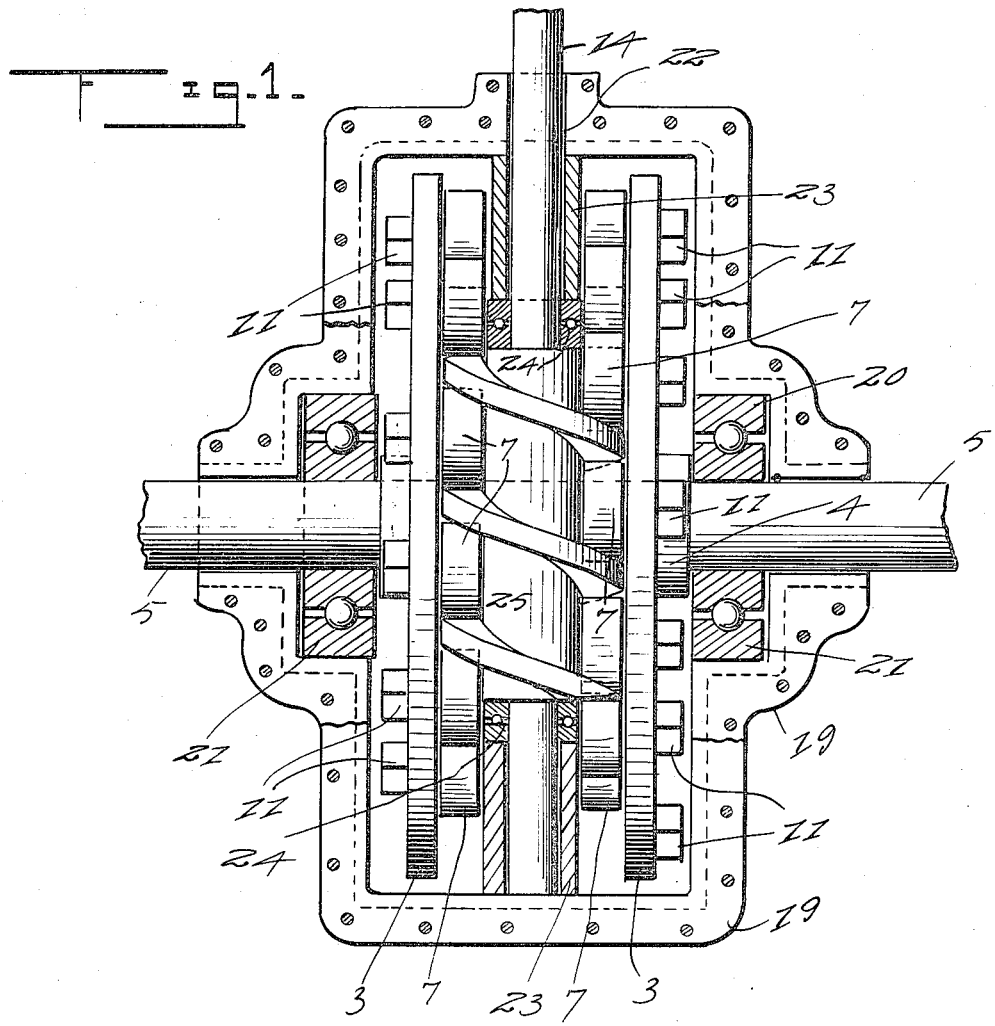
Figure 1 is a plan view of a roller-bearing worm drive constructed in accordance with this invention, the upper section of the gear case being removed.
Fig. 4 is a detail view illustrating the manner of mounting the anti-friction rollers.

In the accompanying drawings, in which is illustrated the preferred embodiment of the invention, the roller-bearing worm drive comprises in its construction a worm actuated wheel 1 provided with a channeled rim composed of spaced side walls 2 and a connecting bottom portion or transverse portion 3 formed integral with the side walls and with the body portion or rim of the wheel 1, as clearly illustrated in Fig. 3 of the drawings. The wheel 1, which is provided with a hub 4, is mounted on a shaft 5.

The side walls 2 of the channeled rim are arranged in parallelism and have mounted on them threaded studs 6 carrying anti-friction rollers 7 recessed at 8 to receive the heads 9 of the studs and alternately arranged at opposite sides of the rim of the wheel. the anti-friction rollers of one side or wall being arranged opposite the intervals between the rollers of the opposite sides, as clearly illustrated in Fig. 1 of the drawings. The threaded studs 6 have threaded shanks 10 piercing the side walls of the channeled rim and provided with exterior nuts 11. The nuts 11 and the threaded shanks enable the rollers and the studs to be readily removed and replaced quickly without the aid of special tools. The rollers are preferably constructed of steel, and sleeves 12 are interposed between the rollers and the studs forming an anti-friction bearing which is adapted to reduce the friction to a minimum. The alternate arrangement of the rollers enables a plurality of rollers to engage a worm 13 of a wall shaft 14, and the main thrust of the worm is substantially in the central horizontal plane of the worm shaft, that is when the worm shaft is arranged as shown in Fig. 2, but of course the relative position of the parts may be changed and the strain will be in the plane of the center of the shaft, as shown.

The worm and the worm actuated wheel are arranged within a gear case composed of upper and lower sections 15 and 16 having attaching flanges 17 arranged in the plane of the shaft 5. The section 15 is also provided with a movable cap 18 provided with an attaching flange secured to the section 15 by means of a similar attaching flange, the attaching flanges 19 being bolted or otherwise secured together, as shown. The upper and lower sections of the gear case are provided at opposite sides with enlargements forming annular or cylindrical portions 20 for the reception of ball-bearing 21 which may be of any desired construction.

The upper section and the cap are provided with sectional bearings 22 having semi-tubular extensions 23 forming thrust-bearing sleeves and ball-bearings 24 are interposed between the enlargements 25 of the worm shaft and the sleeves of the gear case. The shaft 14 has the enlargement 25 to receive the spiral flange of the worm and the ball-bearings preferably consist of annular sections or rings having grooves forming races to receive the balls. Any other kind of anti-friction bearing may of course be employed.

The roller-bearing for engaging the worm eliminates side torque or strain on the worm shaft by causing the main thrust or strain to be in the central horizontal plane of the worm shaft, and the rolling engagement with the worm results in higher efficiency, reduces friction and enables an increased percentage of power to be transmitted. Also the load is carried at a plurality of points or engagements and the rollers may be replaced by simply removing the nuts on the studs, making a low cost of replacement of parts or repairs and a low cost of maintenance or upkeep.

What is claimed is:

1. A roller-bearing worm drive including a shaft having a worm, a wheel provided with rollers arranged to engage with the worm, and a gear case receiving the wheel and the worm and provided with a cap and having sectional bearings at opposite ends of the same, said sectional bearings being provided with semi-tubular extensions forming inwardly projecting thrust sleeves, and roller bearings mounted on the shaft and interposed between the worm and the said sleeves.

2. A roller-bearing worm drive including a gear case composed of upper and lower sections, the upper section having a removable cap, said upper and lower sections having enlargements at opposite sides and the upper section and the cap being provided with sectional bearings, ball-bearings mounted in the said enlargements, a wheel having a shaft arranged in the ball-bearings, rollers carried by the said wheel, a worm shaft journaled in the sectional bearings of the cap and the said upper section and provided with a worm engaging the said rollers, and roller-bearings mounted on the worm shaft and interposed between the same and the gear case.

In testimony whereof I affix my signature in presence of two witnesses.

EDWARD O. COATS.

Witnesses:
WM. INGLISH,
J. D. DUNN.